(12) United States Patent
Chang et al.

(10) Patent No.: US 9,379,823 B2
(45) Date of Patent: Jun. 28, 2016

(54) OPTICAL RECEIVER WITH ADJUSTABLE PULSE-WIDTH FEEDBACK

(71) Applicant: Oracle International Corporation, Redwood City, CA (US)

(72) Inventors: Eric Y. Chang, San Mateo, CA (US); Elad Alon, El Cerrito, CA (US); Frankie Y. Liu, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 82 days.

(21) Appl. No.: 14/516,285

(22) Filed: Oct. 16, 2014

(65) Prior Publication Data

US 2016/0112142 A1    Apr. 21, 2016

(51) Int. Cl.
*H04B 10/69* (2013.01)
*H04B 10/61* (2013.01)

(52) U.S. Cl.
CPC .......... *H04B 10/616* (2013.01); *H04B 10/6971* (2013.01)

(58) Field of Classification Search
CPC ............. H04B 10/697; H04B 10/6972; H04B 10/6973
See application file for complete search history.

(56) References Cited

U.S. PATENT DOCUMENTS

| | | | | |
|---|---|---|---|---|
| 8,238,761 B2* | 8/2012 | Liu | ................... | H04B 10/6911 398/202 |
| 8,626,002 B2* | 1/2014 | Kucharski | ................ | H03F 3/08 375/345 |
| 8,953,952 B2* | 2/2015 | Poesel | ................ | H04B 10/6971 398/208 |
| 2011/0135320 A1* | 6/2011 | Amberg | .................. | H04B 10/69 398/208 |
| 2012/0141122 A1* | 6/2012 | Carusone | ........... | H04B 10/6971 398/37 |
| 2012/0224868 A1* | 9/2012 | Proesel | ............. | H04B 10/6971 398/208 |
| 2013/0216241 A1* | 8/2013 | Proesel | .................. | H04B 10/69 398/213 |
| 2013/0294546 A1* | 11/2013 | Emami-Neyestanak | .. | H03F 1/08 375/319 |
| 2014/0308046 A1* | 10/2014 | Bliss | .................... | H04B 10/695 398/147 |

OTHER PUBLICATIONS

C. Belfiore and J. H. P. Jr., "Decision feedback equalization," Proceedings of the IEEE, vol. 67, pp. 1143-1156, Aug. 1979.
J. Proesel, A. Rylyakov, an C. Schow, "Optical receivers using DFE-IIR equalization," in Proc. IEEE Internal Solid-State Circuits Confrence, 2013.
S. Kasturia and J. Winters, "Techniques for high-speed implementation of nonlinear cancellation," IEEE J. Sel. Areas Commun., vol. 9, pp. 711-717, 1991.

* cited by examiner

*Primary Examiner* — Nathan Curs
(74) *Attorney, Agent, or Firm* — Park, Vaughan, Fleming & Dowler LLP

(57) ABSTRACT

An optical receiver includes a feedback circuit that applies a feedback signal to a front-end circuit prior to the front-end circuit converting an optical signal into an analog electrical signal. In particular, the optical receiver includes a digital slicer that determines a digital electrical signal from the analog electrical signal based on a reference voltage that specifies a decision threshold and a clock that specifies sampling times. The feedback circuit determines the feedback signal at least one previous bit preceding a current bit in the analog electrical signal that is provided by the digital slicer and an impulse response of a communication channel. Moreover, the feedback signal has a pulse width that is less than a bit time of the clock. In this way, the optical receiver can cancel post-cursors of the current bit, even when the communication channel includes a low-pass filter.

20 Claims, 16 Drawing Sheets

OPTICAL RECEIVER WITH ADJUSTABLE PULSE-WIDTH FEEDBACK

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure relates to an optical receiver, and in particular, to an optical receiver that provides improved equalization.

2. Related Art

At the receiving end of an optical link, an optical signal (i.e., light) is usually converted into an analog electrical current by a photo-detector in an optical receiver. The optical receiver often includes a transimpedance amplifier (TIA) to convert and amplify this current into a voltage, which can then be restored to a digital signal level. At high speeds, TIA designs typically require high power to achieve reasonable gain and acceptable noise performance.

At a high data rate, the main cause of optical receiver failure is usually inter-symbol interference (ISI). This means that the communication channel cannot respond to rapid changes in the optical signal and the channel smears a single bit over several bit periods. This effect is illustrated in FIG. 1, which illustrates sampling of an analog electrical signal with equal sampling periods. In this case, an impulse (a single '1' surrounded by '0s') is transmitted across the communication channel. The received waveform for this impulse is called the 'impulse response.' This particular impulse response has a peak at t=2, which is henceforth referred to as the main cursor. Because of communication-channel degradation, the impulse response also has nonzero samples for roughly five clock cycles after the main cursor. These nonzero samples after the main cursor are henceforth called 'post-cursors.'

If a channel has an impulse response with several post cursors, then the post-cursors may interfere with future transmitted bits, making analog-to-digital recovery difficult. For example, FIG. 2 illustrates ISI for a '1010' data pattern transmitted on the communication channel. Because of the post-cursors from the first transmitted '1,' the '0' in between the two '1's has a rather large value, and it can be difficult to tell whether a '0' or '1' was transmitted.

Fortunately, for a deterministic communication channel, ISI is completely deterministic. In principle, if the impulse response of the communication channel is known, the resulting ISI can be corrected. For example, as illustrated in FIG. 3, a multi-tap feedback equalizer can be used to correct for ISI after the optical signal has been converted into an analog electrical signal. (In particular, each tap in the feedback equalizer may correspond to one of the post-cursors.) Exemplary waveforms are shown in FIG. 4. Note that the communication channel in FIG. 4 has the same impulse response as in FIG. 1. Moreover, note that the comparator and the four flip-flops in FIG. 4 all have an initial value of 0.

At t=2, corresponding to the peak of $RX_{in}$, the comparator detects that a '1' was transmitted. Using the known impulse response, it follows that there will be a post-cursor, with an amplitude of 0.25, at t=3. With this information, the optical receiver can then subtract 0.25 from the received waveform at t=3. Applying such correction for all the post-cursors (shown by the other feedback signals in FIG. 4) results in the analog electrical signal ($RX_{in}$) having a perfect impulse response at the sampling points of the comparator. This feedback technique is known as decision feedback equalization (DFE).

DFE typically requires tracking of the history of the previous bits. For example, if a particular communication channel has twenty nonzero post-cursors, then the optical receiver may need to keep track of the past twenty bits in order to apply the corresponding feedback correction. In particular, if the communication channel acts as a first order low-pass filter, the number of post-cursors can be prohibitively large. However, if the feedback correction is applied to the input of the optical receiver (e.g., before the conversion to the analog electrical signal, such as at the output of the photo-detector), the number of previous bits needed can be significantly reduced. In the case of a first-order low-pass-filter communication channel, only a single previous bit may be needed for the feedback correction.

FIG. 5 illustrates an optical receiver with a DFE circuit that takes advantage of a first-order low-pass-filter communication channel. Because the impulse response of a first-order low-pass filter is an exponential decay, if the feedback-correction impulse at the input is properly scaled, the post-cursors associated with the decision-feedback-equalization feedback signal ($DFE_{fb}$) may have the same magnitude as the post-cursors of the photo-current from the photo-diode ($TX_{out}$) thereby perfectly canceling each other out. This is shown in FIGS. 6A and 6B. Consequently, the feedback correction may only need to be applied at the input once, and all the post-cursors can be eliminated.

In an optical link system, because the optical fiber or optical waveguide has much higher bandwidth than electrical wires, signal degradation typically occurs at the interface of the photo-detector and the electrical circuits, where there is a large capacitor due to bonding or wire traces. When combined with any resistance at this interface, this capacitor/resistor combination can be well approximated by a first-order low pass filter (which causes ISI). This input property of an optical receiver makes it a good candidate for applying the DFE technique.

However, because of delay in the optical receiver, there may be a gap between the end of the transmitted impulse response and the start of the feedback-correction impulse response. The effect of this delay is shown in FIG. 7. At t=3, the position of the first post-cursor in the voltage $V_{tx}$ in $RX_{in}$ associated with $TX_{out}$ has not finished settling to its peak value yet. This causes incomplete cancelation of the first post-cursor by the voltage $V_{fb}$ in $RX_{in}$ associated with the $DFE_{fb}$, and can result in a degraded eye diagram and reduced optical-receiver sensitivity. Furthermore, because the post-cursor cancelation ability is limited by the optical-receiver delay, at higher data rates, when bits are more closely spaced, the feedback technique illustrated in FIGS. 6A and 6B may result in not just one, but multiple uncanceled post-cursors. This may impose a severe limit on the achievable data rate.

Hence, what are needed are an optical receiver and an equalization technique without the above-described problems.

SUMMARY

One embodiment of the present disclosure provides an optical receiver that includes a front-end circuit that: receives an optical signal, converts the optical signal into an analog electrical signal, and provides the analog electrical signal at an output. This optical receiver includes a digital slicer that determines a digital electrical signal from the analog electrical signal based on a reference voltage that specifies a decision threshold and a clock that specifies sampling times. Furthermore, the optical receiver includes a feedback circuit that applies a feedback signal to the front-end circuit prior to the conversion, where the feedback signal corresponds to at least one previous bit preceding a current bit in the analog electrical signal and an impulse response of a communication channel, and where the feedback signal has a pulse width that is less than a bit time of the clock.

Note that the impulse response may correspond to a low-pass filter in the front-end circuit, and the feedback signal may correspond to only one previous bit preceding the current bit. For example, the feedback circuit may implement a one-tap decision-feedback equalizer. In addition, the feedback signal may cancel multiple post-cursors of the current bit.

Moreover, the pulse width may correspond to a delay associated with the optical receiver. For example, the delay may be associated with the digital slicer. In addition, the delay may be less than a difference of the bit time and the pulse width.

In some embodiments, the pulse width is adjustable.

Furthermore, the digital slicer may include a comparator. Additionally, the digital slicer may include a decision-feedback equalizer with at least one tap.

In some embodiments, the front-end circuit includes: a photo-detector, an internal node, a current source and an output node.

Another embodiment provides a system that includes an optical transmitter, which provides the optical signal corresponding to a data pattern, and the optical receiver.

Another embodiment provides a method for canceling post-cursors of a current bit in an analog electrical signal. During the method, the front-end circuit receives the optical signal. Then, the front-end circuit converts the optical signal into the analog electrical signal. During this process, a digital slicer determines the digital electrical signal from the analog electrical signal based on the reference voltage that specifies the decision threshold and a clock that specifies sampling times. Next, the feedback circuit applies the feedback signal to the front-end circuit prior to the conversion, where the feedback signal corresponds to at least one previous bit preceding the current bit in the analog electrical signal and the impulse response of the communication channel, and the feedback signal has a pulse width that is less than a bit time of the clock.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a system, an optical receiver in the system, and a method for canceling post-cursors of a current bit in an analog electrical signal are described. The optical receiver includes a feedback circuit that applies a feedback signal to a front-end circuit prior to the front-end circuit converting an optical signal into an analog electrical signal. In particular, the optical receiver includes a digital slicer that determines a digital electrical signal from the analog electrical signal based on a reference voltage that specifies a decision threshold and a clock that specifies sampling times. The feedback circuit determines the feedback signal at least one previous bit preceding a current bit in the analog electrical signal that is provided by the digital slicer and an impulse response of a communication channel. Moreover, the feedback signal has a pulse width that is less than a bit time of the clock.

In this way, the optical receiver can cancel post-cursors of the current bit, even when the communication channel includes to a low-pass filter. Moreover, the optical receiver may relax the tradeoffs between gain and noise performance, thereby simplifying the design of the optical receiver. In addition, the optical receiver may remove or reduce the sensitivity to the delay of the optical receiver. This may reduce the mean-square error of an equalizer relative to a target, increase the size of an opening in an eye pattern, and/or improve the error rate of the optical receiver.

Figure 8:
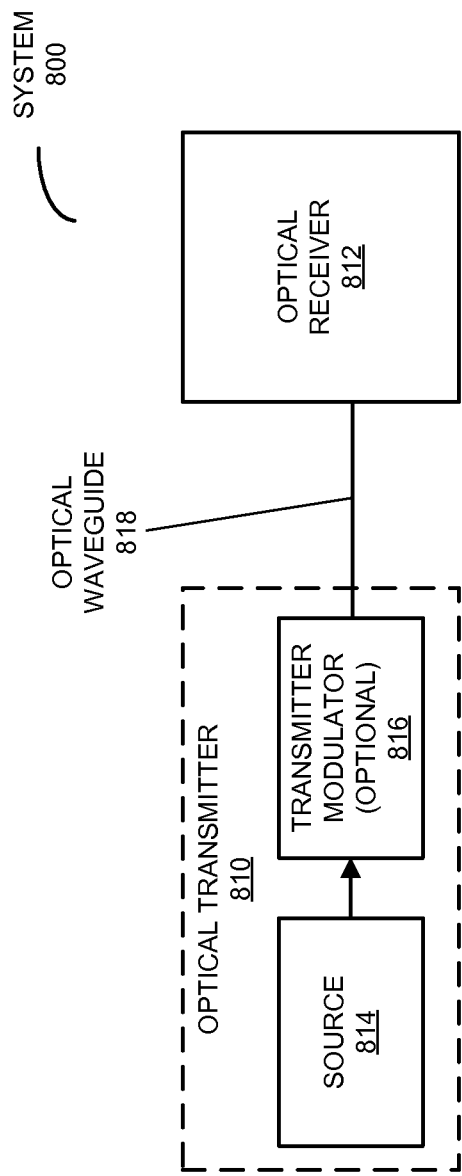
FIG. 8 is a block diagram illustrating a system in accordance with an embodiment of the present disclosure.

We now describe embodiments of a system and an optical receiver. FIG. 8 presents a block diagram illustrating a system 800. This system includes an optical transmitter 810 and an optical receiver 812. During a normal operating mode, source 814 and optional transmitter modulator 816 in optical transmitter 810 provide an optical signal (corresponding to a data pattern) to optical receiver 812 via optical waveguide 818 (or an optical fiber).

Figure 9:
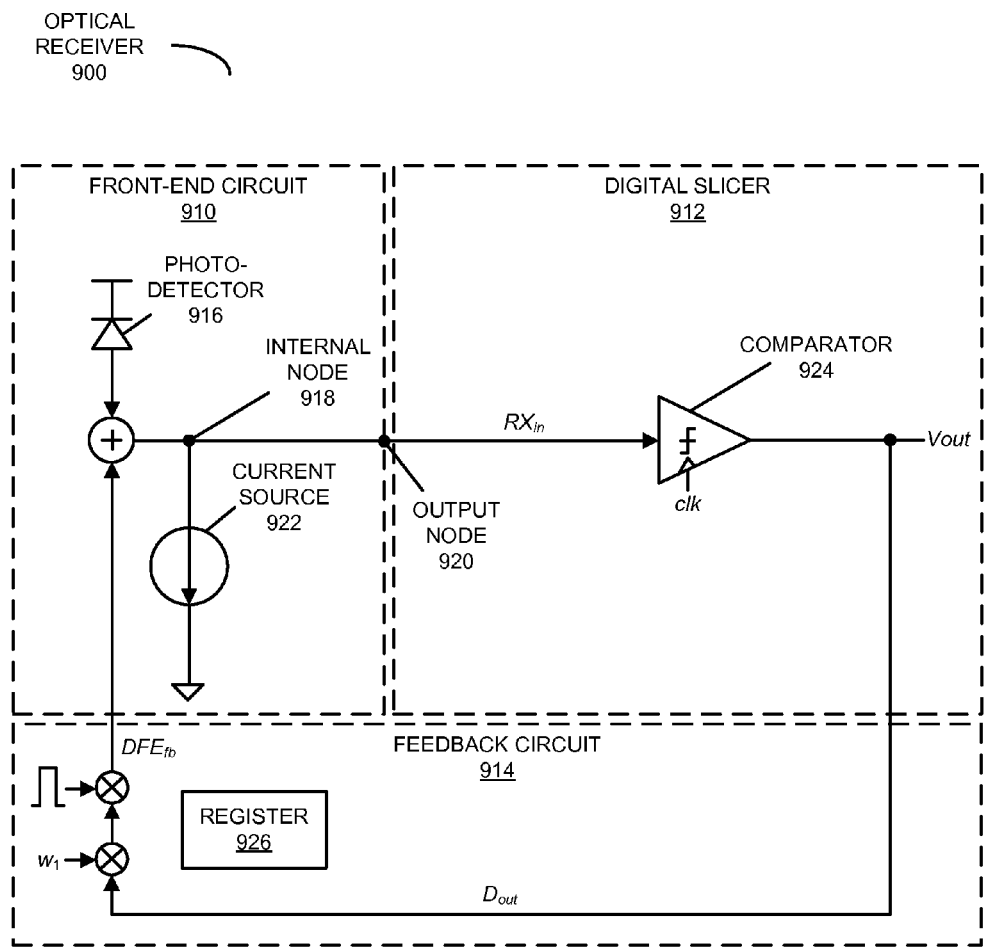
FIG. 9 is a block diagram illustrating an optical receiver in the system of FIG. 8 in accordance with an embodiment of the present disclosure.

FIG. 9 presents a block diagram illustrating an optical receiver 900 in system 800 in FIG. 8 (such as optical receiver 812). This optical receiver may include a front-end circuit 910 that receives an optical signal, converts the optical signal into an analog electrical signal, and provides the analog signal.

Furthermore, optical receiver 900 includes a digital slicer 912 (such as comparator 924) that determines a digital electrical signal from the analog electrical signal based on a reference voltage that specifies a decision threshold of the digital slicer and a clock (clk) that specifies sampling times. In an exemplary embodiment, optical receiver 900 operates at 5-25 Gbps.

Additionally, optical receiver 900 includes a feedback circuit 914 that applies a feedback signal to front-end circuit 910 prior to the conversion. Note that the feedback signal corresponds to at least one previous bit preceding a current bit in the analog electrical signal and an impulse response of a communication channel, and the feedback signal has a pulse width that is less than a bit time of the clock. This pulse width may be adjustable. For example, as shown in FIG. 9, optical receiver 900 may include a multiplier (and, more generally, a pulse-width adjustment circuit) that modifies the pulse width, which may be before or after a multiplier that modifies the weight or amplitude $w_1$ of the $DFE_{fb}$.

In some embodiments, front-end circuit 910 includes: a photo-detector 916 (which outputs a variable current), an internal node 918, an output node 920, and a current source 922.

For example, the impulse response may correspond to a low-pass filter in front-end circuit 910, and the feedback signal may correspond to only one previous bit preceding the current bit. In an exemplary embodiment, feedback circuit 914 implements a one-tap decision-feedback equalizer. In addition, the feedback signal may cancel multiple post-cursors of the current bit.

Moreover, the pulse width may correspond to a delay associated with optical receiver 900 (thus, an adjustable pulse width may allow compensation for changes in the delay). For example, the delay may be associated with digital slicer 912. In addition, the delay may be less than a difference of the bit time and the pulse width.

The basic idea behind optical receiver 900 is based on the observation that incomplete cancelation of the first post-cursor is caused by the slow settling time of the voltage $V_{fb}$ in $RX_{in}$ associated with the $DFE_{fb}$. However, the settling time is equal to the pulse width of the $DFE_{fb}$. Thus, the first post-cursor may be completely canceled if a narrow, stronger (higher amplitude) pulse is used to generate the $DFE_{fb}$. As shown in FIG. 9, this may be implemented by modifying the pulse width of the feedback signal.

Figure 10:
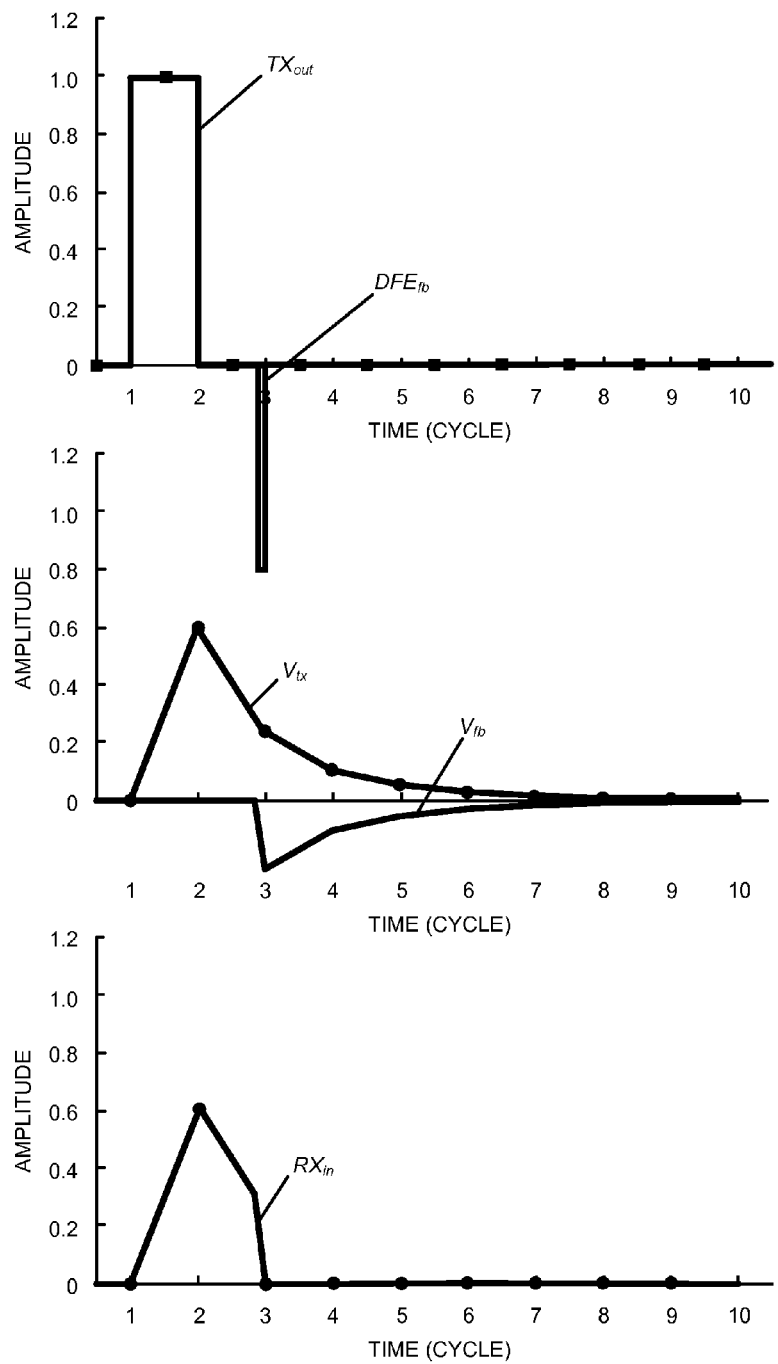
FIG. 10 is a drawing illustrating electrical signals in the optical receiver of FIG. 9.

The impact is shown in FIG. 10, which presents a drawing illustrating electrical signals in optical receiver 900 (FIG. 9). In particular, by using a narrow and strong pulse, $V_{fb}$ rises more sharply and settles to the peak value much faster. This enables the first post-cursor to be canceled in spite of the delay in optical receiver 900 (FIG. 9). In order to control the pulse width of the feedback-correction impulse, the duty cycle of the periodic pulse train used to produce the $DFE_{fb}$ may be adjusted. In this pulse train, the falling edge in each cycle may occur before the rising edge of the clock. This criterion may ensure that $V_{fb}$ settles before the first post-cursor. In some embodiments, an inverted clock is used as the pulse train. In these embodiments, the pulse width may be equivalent to half the bit period.

Let $T_{delay}$ be the delay of comparator 924, $T_{bit}$ be the bit period of the clock and $T_{pulse}$ be the pulse width of the pulse train. If the falling edge of the pulse train coincides with the rising edge of the clock, then the stability criterion is $$T_{delay} < T_{bit} - T_{pulse}.$$

This criterion may ensure that the $DFE_{fb}$ is stable. If an inverted clock is used as the pulse train, this implies that the output of comparator 924 must settle within $T_{bit}/2$. This may be a stringent timing requirement. However, the timing constraint can be relaxed by reducing $T_{pulse}$. In the limit that $T_{pulse}$ equals zero, the criterion is that $T_{delay}$ is less than $T_{bit}$, which is the timing constraint in traditional decision feedback equalization. Note that as $T_{pulse}$ is decreased, noise in the weight or amplitude $w_1$ of the $DFE_{fb}$ may impact the performance of optical receiver 900 (FIG. 9), because there is less of a time-averaging effect.

Figure 11:
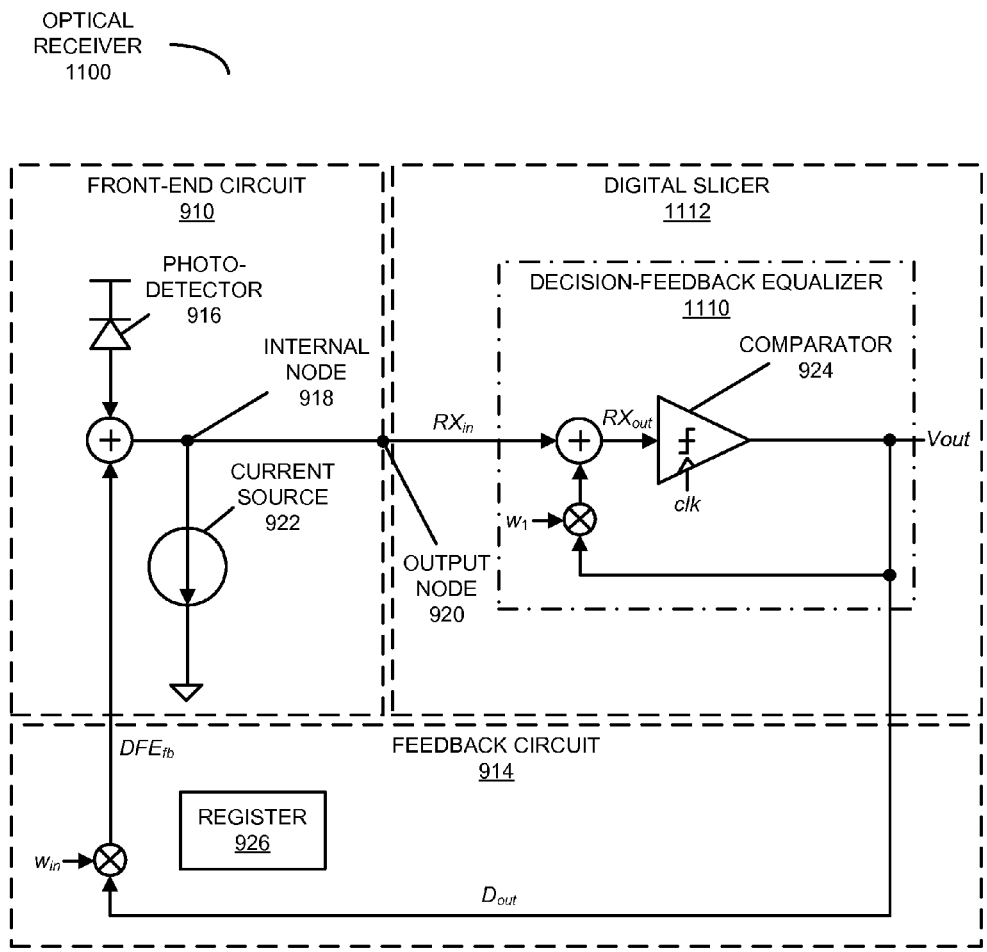
FIG. 11 is a block diagram illustrating an optical receiver in the system of FIG. 8 in accordance with an embodiment of the present disclosure.

In some embodiments, a loop-unrolled structure is used in feedback circuit 914 (FIG. 9) to relax the timing criterion. Another embodiment to address the timing criterion is shown in FIG. 11, which presents a block diagram illustrating an optical receiver 1100 in system 800 in FIG. 8 (such as optical receiver 812). This optical receiver includes dual decision-feedback-equalization loops. The basic idea is that, while the equalization technique in FIG. 9 can cancel multiple post-cursors, because of delay or timing constraints it may not be able to cancel the first couple post-cursors. In FIG. 11, a decision-feedback equalizer 1110 with at least one tap in digital slicer 1112 is used to handle these problematic post-cursors.

Figure 7:
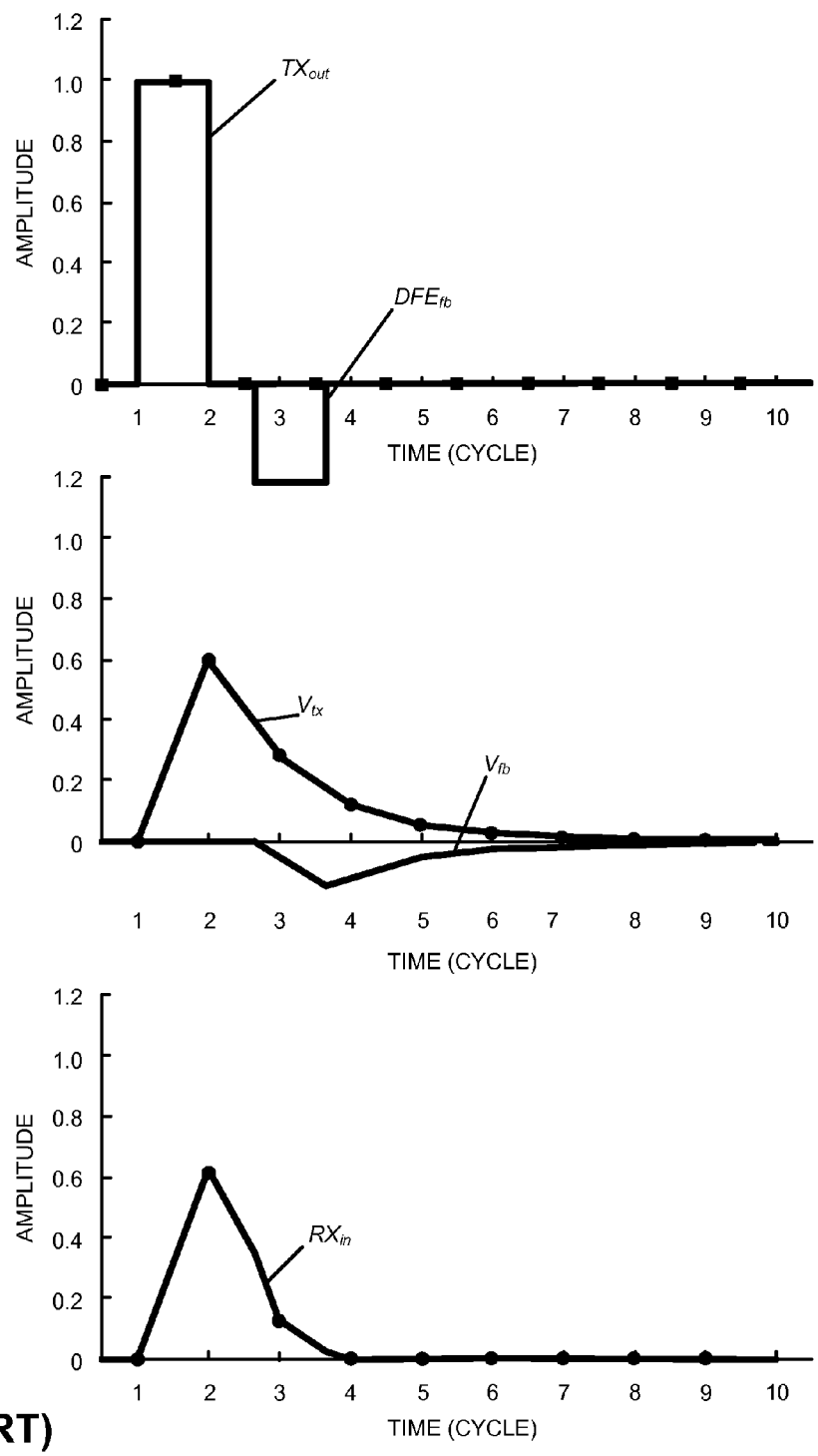
FIG. 7 is a drawing illustrating existing electrical signals in the optical receiver of FIG. 5.
Figure 12A:
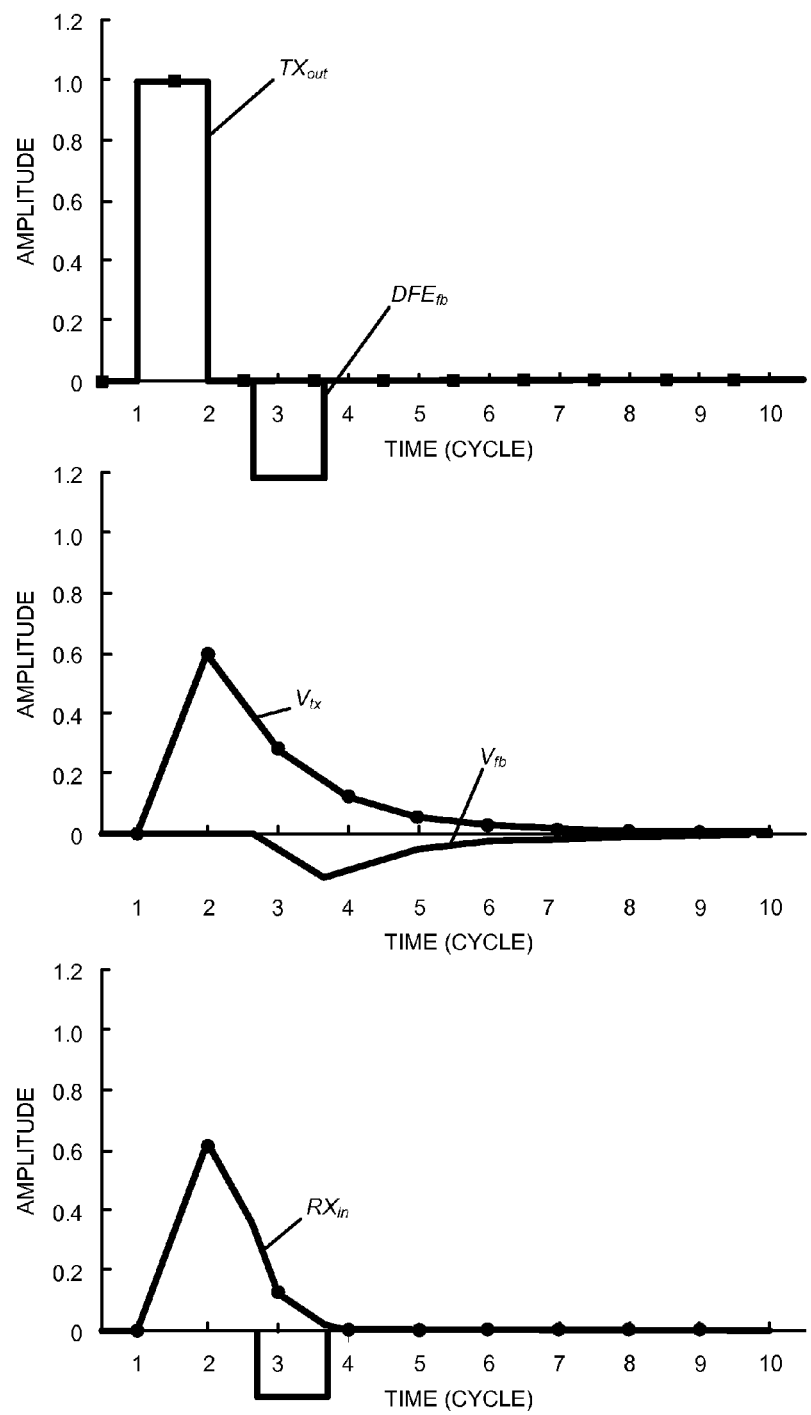
FIG. 12A is a drawing illustrating electrical signals in the optical receiver of FIG. 11.
Figure 12B:
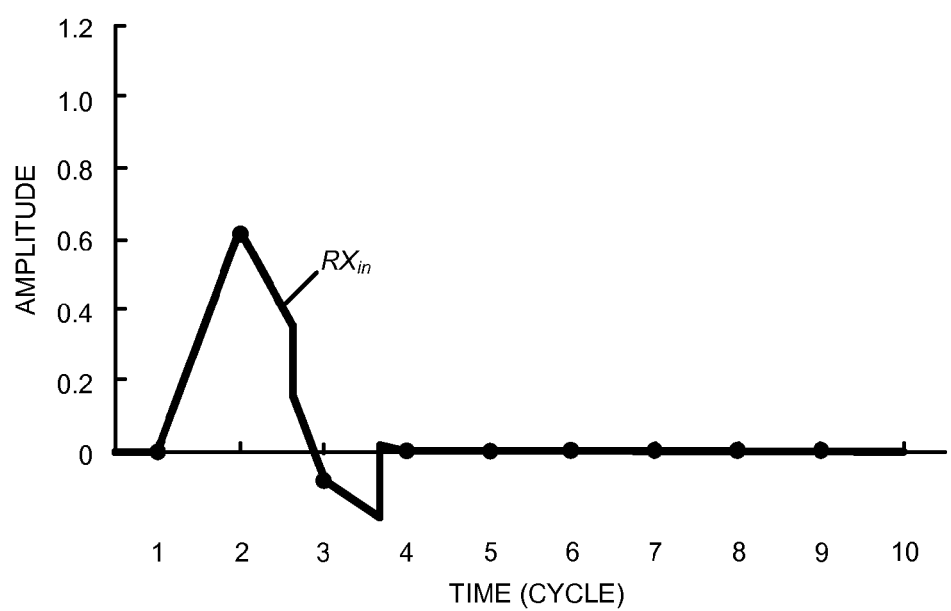
FIG. 12B is a drawing illustrating electrical signals in the optical receiver of FIG. 11.

The impact of the dual decision-feedback-equalizers is shown in FIGS. 12A and 12B, which present drawings illustrating electrical signals in optical receiver 1100 (FIG. 11). The waveforms in the curves in FIG. 12A are identical to those in FIG. 7, but by supplementing comparator 924 (FIG. 9) with decision-feedback equalizer 1110 with at least one tap, the troublesome post-cursor is canceled in FIG. 12B.

Figure 1:
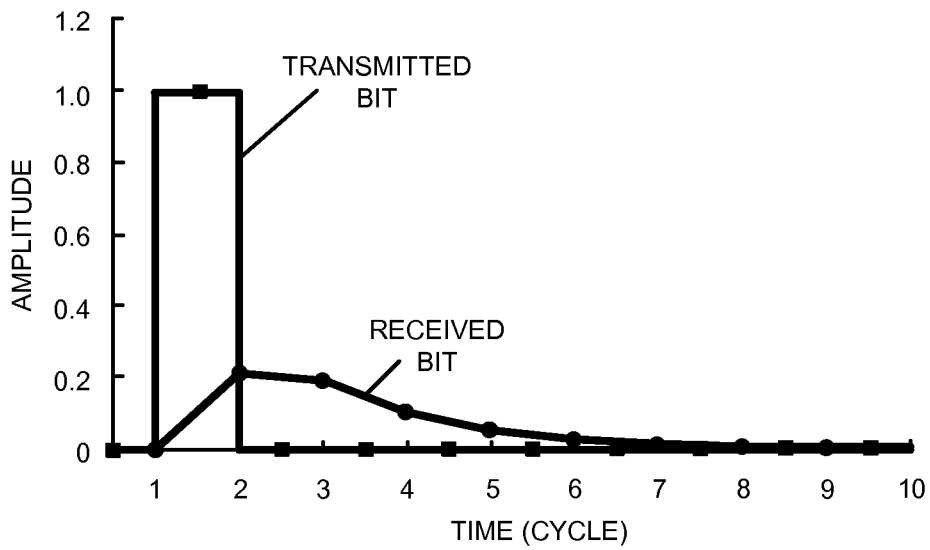
FIG. 1 is a drawing illustrating intersymbol interference (ISI) in existing electrical signals.
Figure 2:
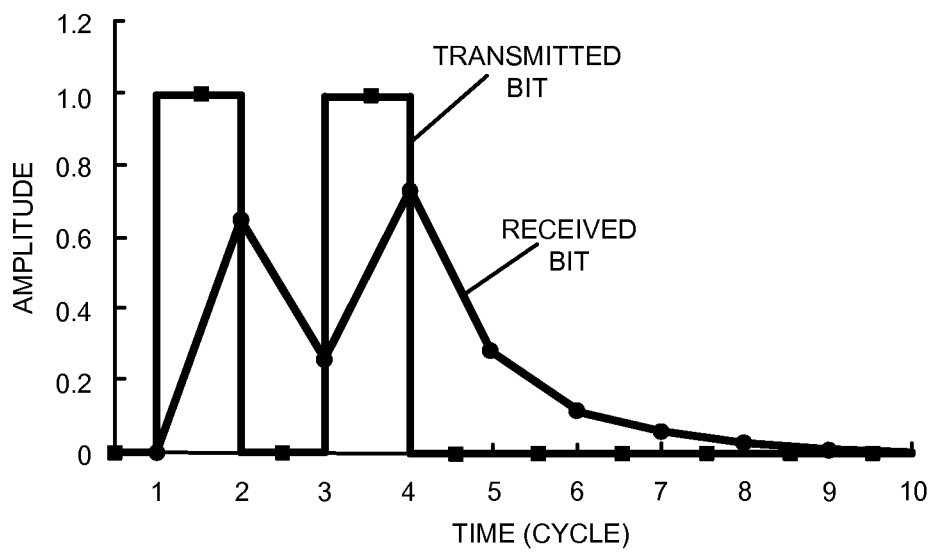
FIG. 2 is a drawing illustrating ISI in existing electrical signals that is associated with a '1010' data pattern.
Figure 3:
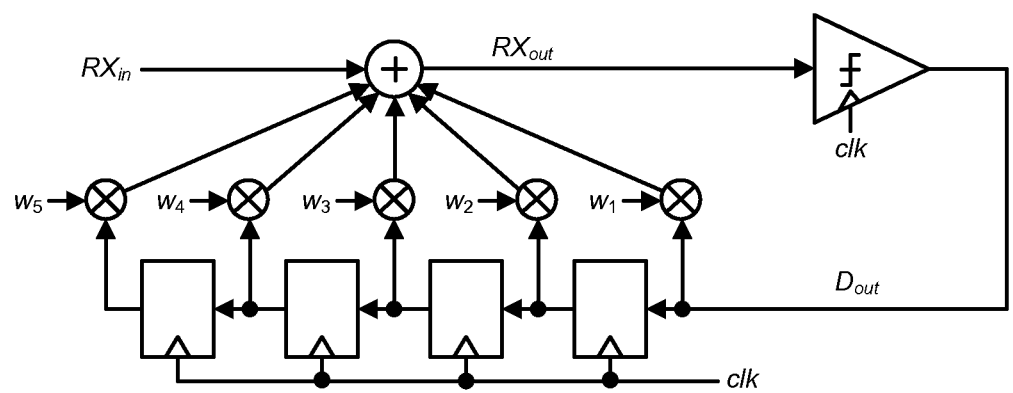
FIG. 3 is a block diagram illustrating an existing optical receiver with a decision-feedback equalizer.
Figure 4:
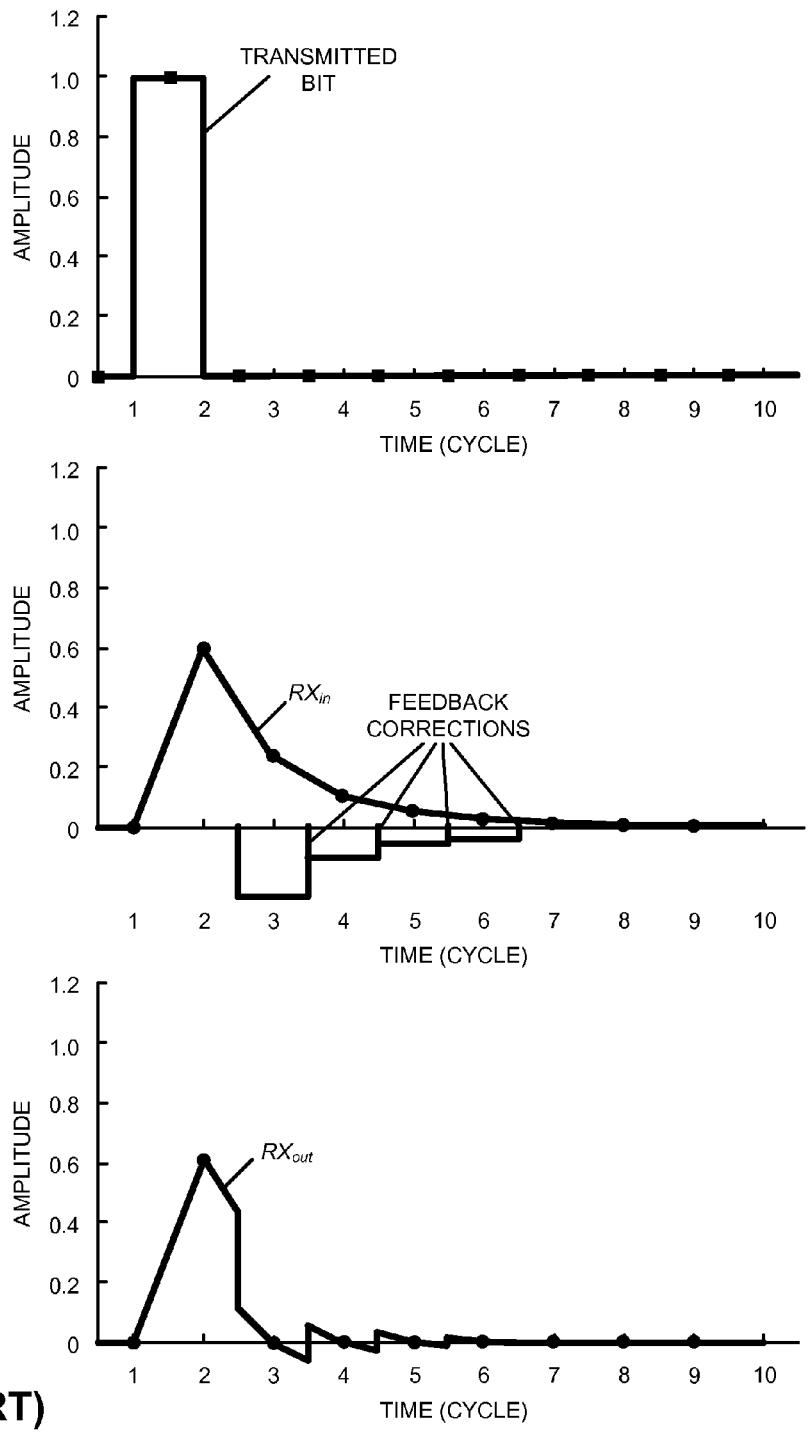
FIG. 4 is a drawing illustrating existing electrical signals in the optical receiver of FIG. 3.
Figure 5:
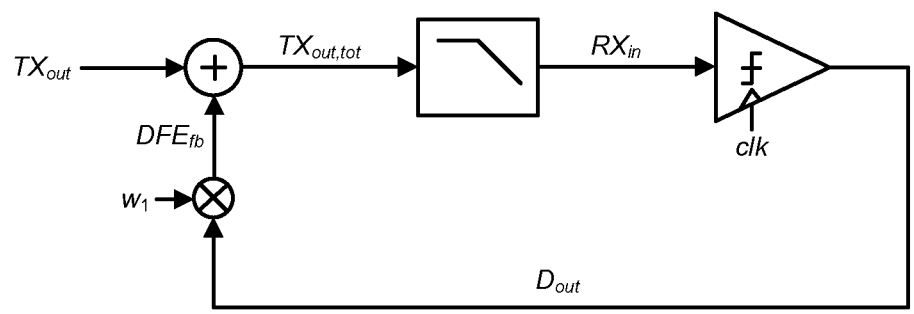
FIG. 5 is a block diagram illustrating an existing optical receiver with a decision-feedback equalizer for a first-order low-pass-filter communication channel.
Figure 6A:
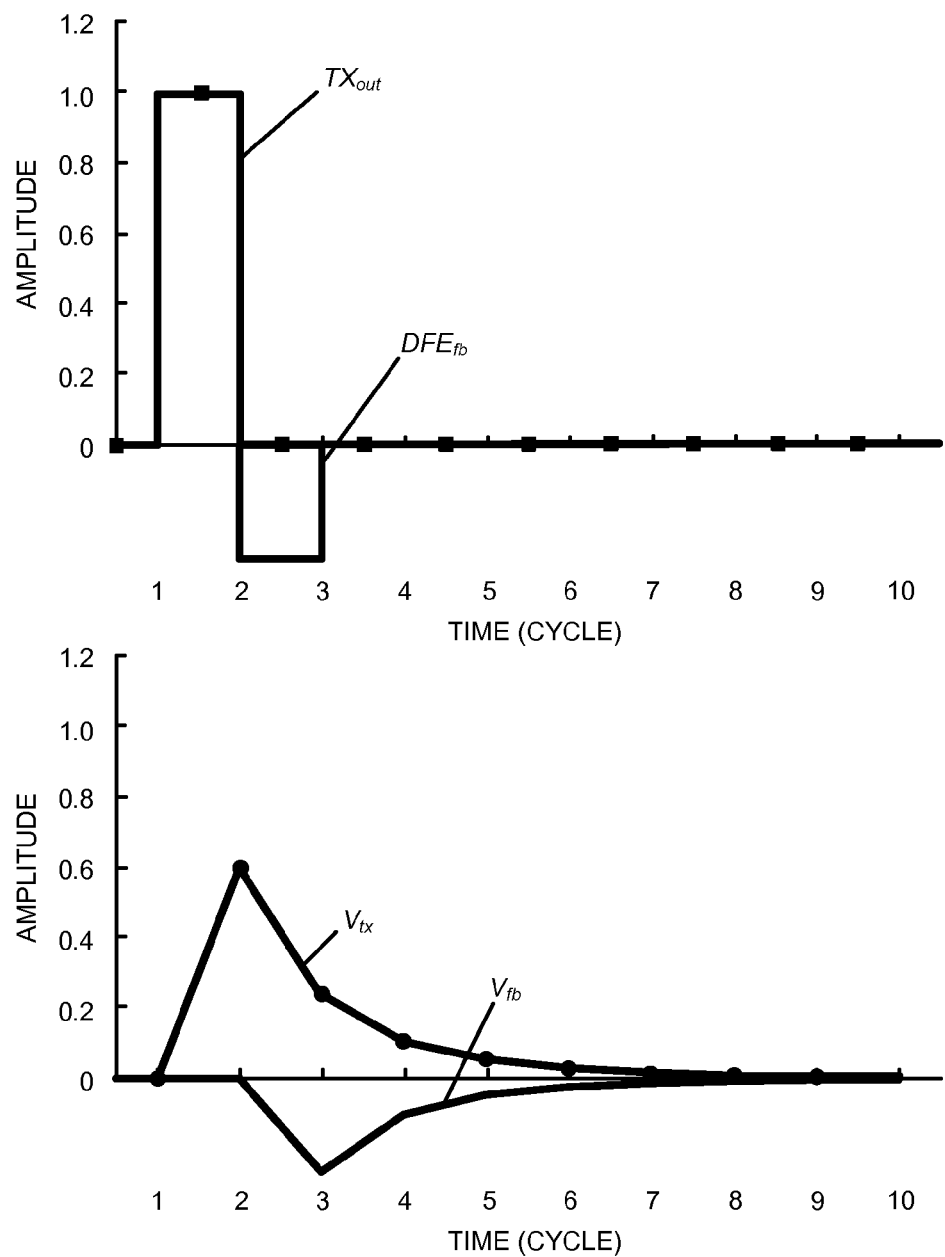
FIG. 6A is a drawing illustrating existing electrical signals in the optical receiver of FIG. 5.
Figure 6B:
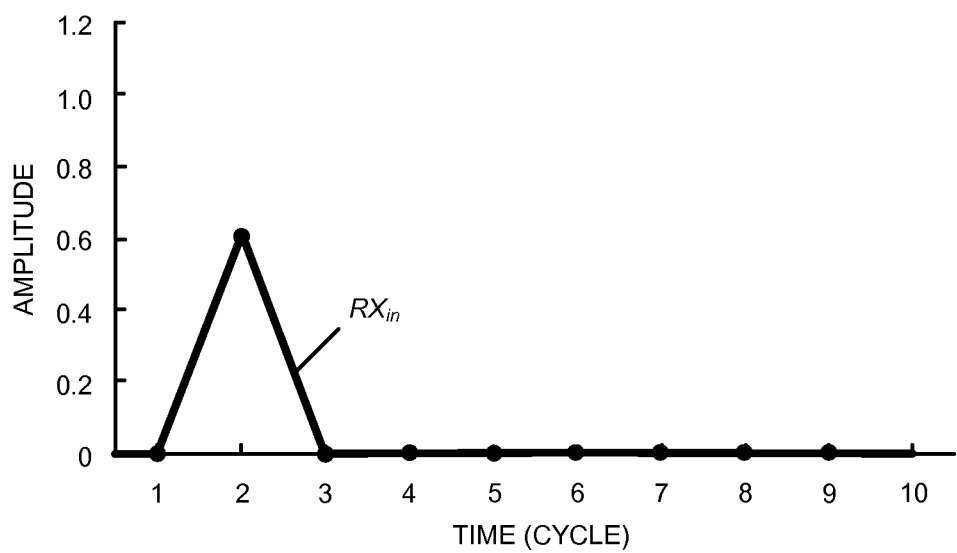
FIG. 6B is a drawing illustrating existing electrical signals in the optical receiver of FIG. 5.

In this design, there are no timing requirements on the $DFE_{fb}$ feedback path. A long delay on this path just means that decision-feedback equalizer 1110 needs to cancel more than one post-cursor, which can be accomplished with a design similar to FIG. 3. While there are still timing requirements on decision-feedback equalizer 1110, these can be solved with loop-unrolling techniques.

Optical receiver 1100 (FIG. 11) also relaxes the amplifier design in the optical receiver. In particular, between internal node 918 and comparator 924, there are generally several stages of amplifiers to boost the optical-receiver sensitivity. However, because the equalization technique relies on the assumption that the whole link looks like a first order low-pass filter, these amplifiers may need to have much higher bandwidth to make that assumption valid.

Figure 13A:
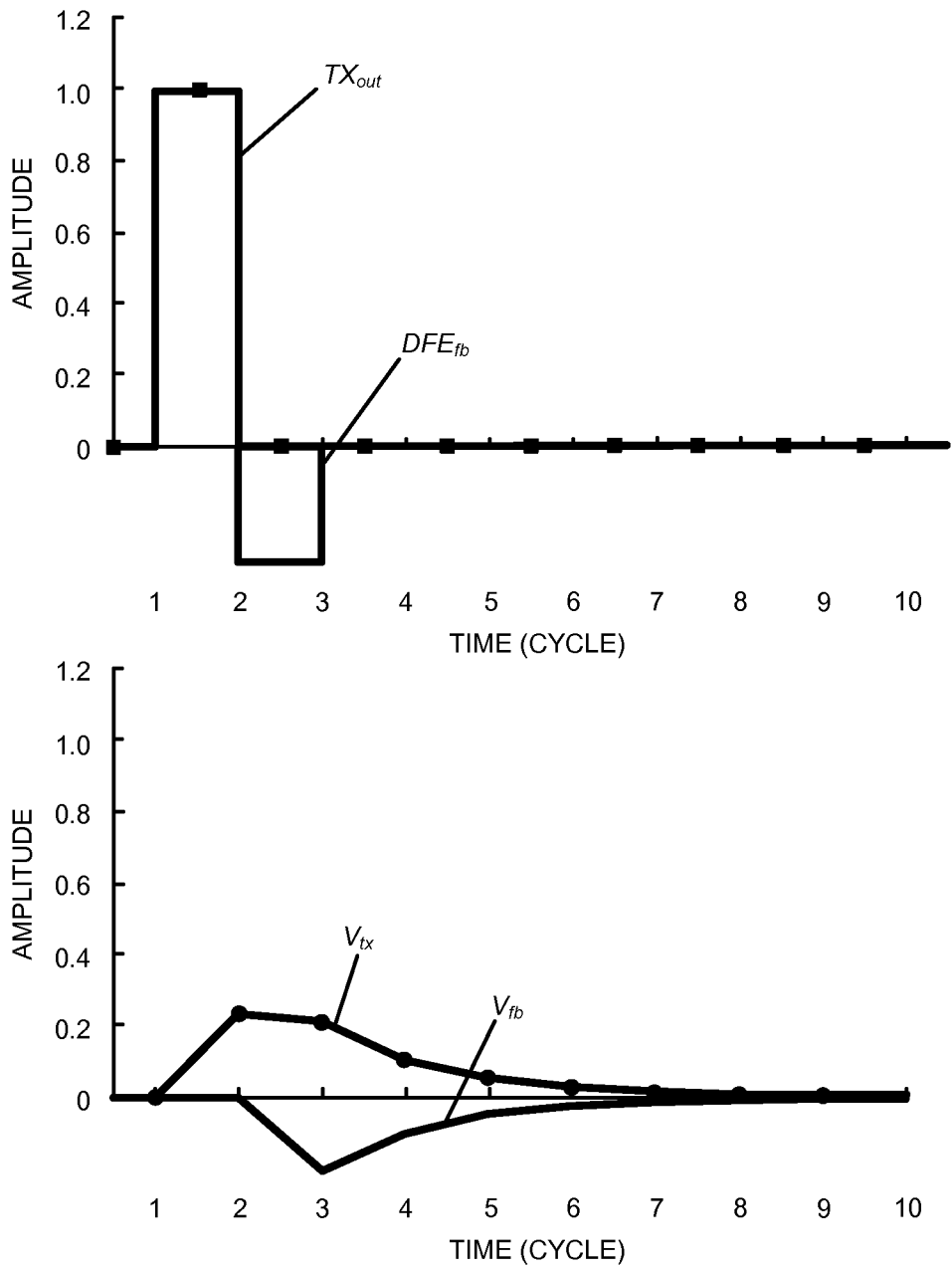
FIG. 13A is a drawing illustrating electrical signals in the optical receiver of FIG. 11.
Figure 13B:
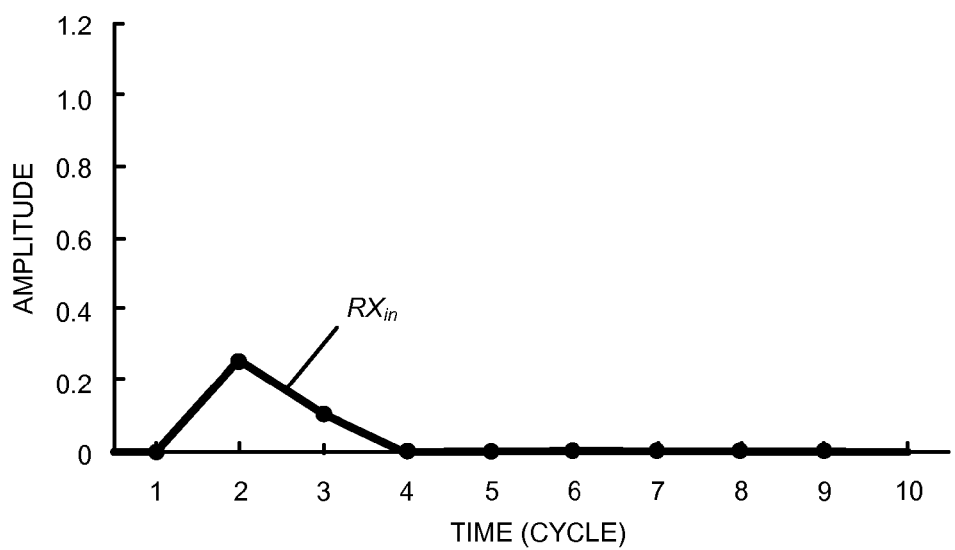
FIG. 13B is a drawing illustrating electrical signals in the optical receiver of FIG. 11.

FIGS. 13A and 13B presents drawings illustrating electrical signals in optical receiver 1100 (FIG. 11) if the communication channel is a two-pole system instead of a first-order low-pass filter. Even with zero delay, the first two post-cursors are still not perfectly canceled. However, using the equalization technique illustrated in FIG. 11, this is no longer a problem. Decision-feedback equalizer 1110 can simply absorb these non-ideal post-cursors into its cancelation. This allows the designer to use lower bandwidth amplifiers, potentially offering savings in power and/or increased sensitivity.

Figure 14:
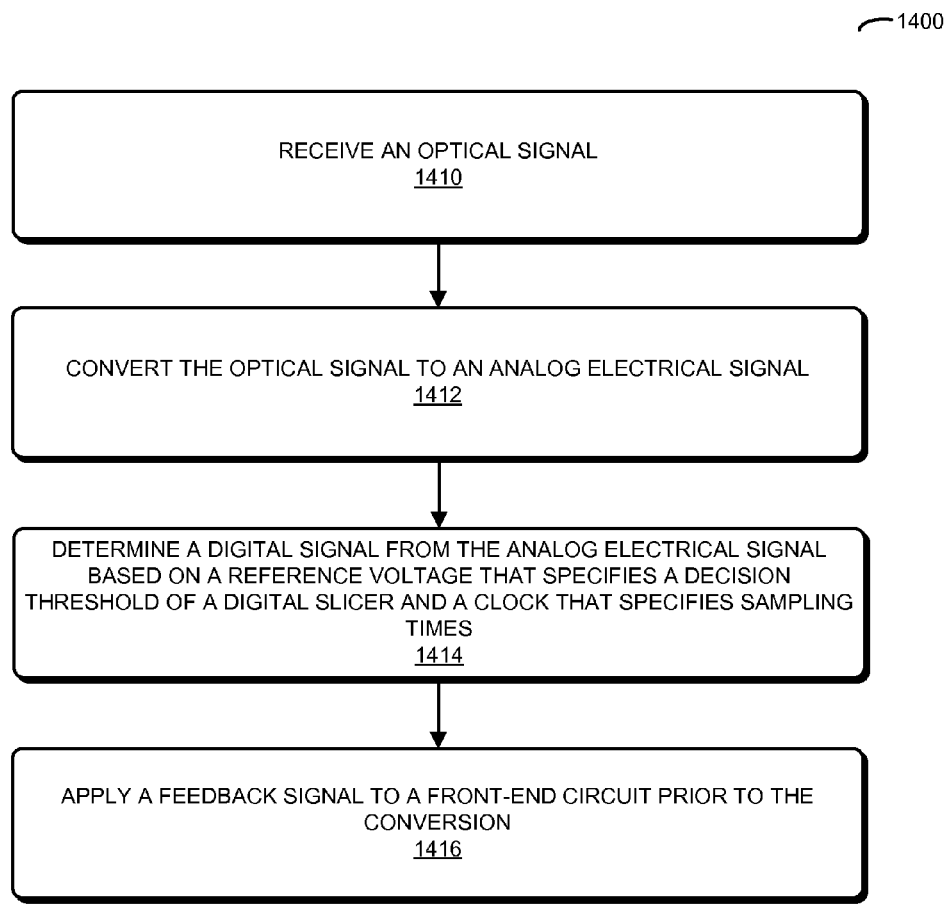
FIG. 14 is a method for canceling post-cursors of a current bit in an analog electrical signal in accordance with an embodiment of the present disclosure.

We now describe embodiments of the method. FIG. 14 presents a method 1400 for canceling post-cursors of a current bit in an analog electrical signal, which may be performed by one of the preceding embodiments of the optical receiver. During this method, a front-end circuit in the optical receiver receives an optical signal (operation 1410). Then, the front-end circuit converts the optical signal into the analog electrical signal (operation 1412). Moreover, a digital slicer in the optical receiver determines a digital electrical signal from the analog electrical signal based on a reference voltage that specifies a decision threshold of the digital slicer and a clock that specifies sampling times (operation 1414). Next, a feedback circuit in the optical receiver applies a feedback signal to the front-end circuit prior to the conversion (operation 1416), where the feedback signal corresponds to at least one previous bit preceding the current bit in the analog electrical signal and an impulse response of a communication channel, and the feedback signal has a pulse width that is less than a bit time of the clock.

In some embodiments of method 1400, there are additional or fewer operations. Moreover, the order of the operations may be changed and/or two or more operations may be combined into a single operation.

Furthermore, system 800 (FIG. 8), optical receiver 900 (FIG. 9) and/or optical receiver 1100 (FIG. 11) may include fewer components or additional components. Moreover, feedback circuit 914 (FIGS. 9 and 11) may store one or more values corresponding to the pulse width. For example, the one or more values may be stored in register 926 (FIGS. 9 and 11). The one or more values may be determined during a calibration process that adjusts the pulse width to minimize a mean-square error (relative to an impulse-response target), maximize an eye-pattern opening and/or reduce an error rate.

Additionally, although these optical receivers and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Furthermore, signals in these embodiments may include digital signals that have approximately discrete values and/or analog signals that have continuous values. Additionally, components and circuits may be single-ended or differential, and power supplies may be unipolar or bipolar.

Note that some or all of the functionality of system 800 (FIG. 8), optical receiver 900 (FIG. 9) and/or optical receiver 1100 (FIG. 11) may be implemented in one or more application-specific integrated circuits (ASICs) and/or one or more digital signal processors (DSPs). Furthermore, functionality in system 800 (FIG. 8), optical receiver 900 (FIG. 9) and/or optical receiver 1100 (FIG. 11) may be implemented more in hardware and less in software, or less in hardware and more in software, as is known in the art. Additionally, the circuits in the preceding embodiments may be implemented using: complementary metal-oxide-semiconductor (CMOS), NMOS, p-type metal-oxide-semiconductor (PMOS) and/or bipolar-junction transistors.

The optical receiver can be used in a wide variety of applications, including communications, high-performance computing, etc. As a consequence, the system may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a workstation, a mainframe computer, a blade, an enterprise computer, a data center, a portable-computing device, a tablet computer, a supercomputer, a network-attached-storage (NAS) system, a storage-area-network (SAN) system, and/or another electronic computing device. In some embodiments, the computer system may be at one location or may be distributed over multiple, geographically dispersed locations.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical receiver, comprising:
a front-end circuit configured to receive an optical signal, to convert the optical signal into an analog electrical signal, and to provide the analog electrical signal at an output;
a digital slicer, coupled to the front-end circuit, configured to determine a digital electrical signal from the analog electrical signal based on a reference voltage that specifies a decision threshold and a clock that specifies sampling times; and
a feedback circuit, coupled to the digital slicer and the front-end circuit, configured to apply a feedback signal to the front-end circuit, wherein the feedback signal corresponds to at least one previous bit preceding a current bit in the analog electrical signal and an impulse response of a communication channel; and
wherein the feedback signal has a pulse width that is less than a bit time of the clock.

2. The optical receiver of claim 1, wherein the impulse response corresponds to a low-pass filter in the front-end circuit; and
wherein the feedback signal corresponds to only one previous bit preceding the current bit.

3. The optical receiver of claim 1, wherein the feedback circuit implements a one-tap decision-feedback equalizer.

4. The optical receiver of claim 3, wherein the feedback signal cancels multiple post-cursors of the current bit.

5. The optical receiver of claim 1, wherein the pulse width corresponds to a delay associated with the optical receiver.

6. The optical receiver of claim 5, wherein the delay is associated with the digital slicer.

7. The optical receiver of claim 5, wherein the delay is less than a difference of the bit time and the pulse width.

8. The optical receiver of claim 1, wherein the pulse width is adjustable.

9. The optical receiver of claim 1, wherein the digital slicer includes a comparator.

10. The optical receiver of claim 9, wherein the digital slicer further includes a decision-feedback equalizer with at least one tap.

11. The optical receiver of claim 1, wherein the front-end circuit includes:
a photo-detector;
an internal node coupled to the photo-detector, a current source and an output node;
the current source; and
the output node coupled to the digital slicer.

12. A system, comprising:
an optical transmitter configured to provide an optical signal corresponding to a data pattern; and an optical receiver, wherein the optical receiver includes:
- a front-end circuit configured to receive an optical signal, to convert the optical signal into an analog electrical signal, and to provide the analog electrical signal at an output;
- a digital slicer, coupled to the front-end circuit, configured to determine a digital electrical signal from the analog electrical signal based on a reference voltage that specifies a decision threshold and a clock that specifies sampling times; and
- a feedback circuit, coupled to the digital slicer and the front-end circuit, configured to apply a feedback signal to the front-end circuit, wherein the feedback signal corresponds to at least one previous bit preceding a current bit in the analog electrical signal and an impulse response of a communication channel; and
- wherein the feedback signal has a pulse width that is less than a bit time of the clock.

13. The system of claim 12, wherein the impulse response corresponds to a low-pass filter in the front-end circuit; and
wherein the feedback signal corresponds to only one previous bit preceding the current bit.

14. The system of claim 12, wherein the feedback circuit implements a one-tap decision-feedback equalizer.

15. The system of claim 14, wherein the feedback signal cancels multiple post-cursors of the current bit.

16. The system of claim 12, wherein the pulse width corresponds to a delay associated with the optical receiver.

17. The system of claim 16, wherein the delay is less than a difference of the bit time and the pulse width.

18. The system of claim 12, wherein the pulse width is adjustable.

19. The system of claim 12, wherein the digital slicer includes:
- a comparator; and
- a decision-feedback equalizer with at least one tap.

20. A method for canceling post-cursors of a current bit in an analog electrical signal, comprising:
- receiving an optical signal using a front-end circuit;
- converting the optical signal into the analog electrical signal using the front-end circuit;
- determining a digital electrical signal from the analog electrical signal using a digital slicer based on a reference voltage that specifies a decision threshold and a clock that specifies sampling times; and
- applying a feedback signal to the front-end circuit using a feedback circuit, wherein the feedback signal corresponds to at least one previous bit preceding a current bit in the analog electrical signal and an impulse response of a communication channel; and
- wherein the feedback signal has a pulse width that is less than a bit time of the clock.

* * * * *